United States Patent
Nakano et al.

(10) Patent No.: US 8,004,221 B2
(45) Date of Patent: Aug. 23, 2011

(54) INVERTER SYSTEM FOR VEHICLE-MOUNTED AIR CONDITIONER

(75) Inventors: Koji Nakano, Aichi-ken (JP); Takashi Nakagami, Aichi-ken (JP); Hiroyuki Kamitani, Aichi-ken (JP); Makoto Hattori, Aichi-ken (JP); Koji Toyama, Nagasaki-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 372 days.

(21) Appl. No.: 12/236,962

(22) Filed: Sep. 24, 2008

(65) Prior Publication Data

US 2009/0146594 A1 Jun. 11, 2009

(30) Foreign Application Priority Data

Dec. 6, 2007 (JP) .................................. 2007-315316

(51) Int. Cl.
*H02P 6/14* (2006.01)
(52) U.S. Cl. .............. 318/400.26; 318/700; 318/400.01; 318/139
(58) Field of Classification Search ............. 318/400.26, 318/400.01, 700, 139
See application file for complete search history.

(56) References Cited

U.S. PATENT DOCUMENTS

| | | | | | |
|---|---|---|---|---|---|
| 4,667,480 | A | * | 5/1987 | Bessler | 62/180 |
| 5,577,152 | A | * | 11/1996 | Chen | 388/804 |
| 5,595,064 | A | * | 1/1997 | Ikeda et al. | 62/126 |
| 5,963,442 | A | * | 10/1999 | Yoshida et al. | 363/98 |
| 6,646,411 | B2 | * | 11/2003 | Hirono et al. | 318/801 |

FOREIGN PATENT DOCUMENTS

JP  11-189032 A  7/1999

* cited by examiner

*Primary Examiner* — Bentsu Ro
*Assistant Examiner* — David S Luo
(74) *Attorney, Agent, or Firm* — Westerman, Hattori, Daniels & Adrian, LLP

(57) ABSTRACT

The present invention has an object to provide an inverter system for a vehicle-mounted air conditioner that prevents noise from entering a control circuit and allows high speed communication. A motor control microcomputer 24 is isolated from a gate circuit 22, and communication therebetween is performed via a photocoupler 80. This suppresses the influence of noise resulting from changes caused by changes in voltage and current that occur in a high voltage system for driving a motor 30. Also, the motor control microcomputer 24 and a communication driver 27 can be directly bus-connected without a photocoupler, thereby allowing high speed communication therebetween.

7 Claims, 2 Drawing Sheets

INVERTER SYSTEM FOR VEHICLE-MOUNTED AIR CONDITIONER

BACKGROUND OF THE INVENTION

1. Field of the Invention

The present invention relates to an inverter system for a vehicle-mounted air conditioner.

2. Description of the Related Art

A motor for driving a compressor that constitutes a vehicle-mounted air conditioner is controlled in operation by an inverter system.

As shown in FIG. 2, a conventional inverter system 1 operates at a low voltage of about 5 V or 15 V converted by a non-isolated DC-DC converter 4 from a high voltage of 100 V or more supplied from a high voltage power supply 3 for driving a motor 2. The inverter system 1 communicates with a host ECU 6 via a communication interface 5 for controlling a vehicle-mounted air conditioner or the like. Other electrical equipment systems of a vehicle including the host ECU 6 for the inverter system 1 or the like operates at a voltage of 12 V or 24 V supplied from a vehicle-mounted battery power supply 7. The high voltage for driving the motor 2 being applied to the other electrical equipment systems for some reasons may lead to a failure, and thus the inverter system 1 and the other electrical equipment systems can communicate with each other while being isolated by an isolated communication connector 8 such as a photocoupler (for example, see Japanese Patent No. 3351330).

In the above described configuration, a GND (ground) potential of a control circuit such as a control microcomputer 9 that constitutes the inverter system 1 has the same potential as a GND potential of a high voltage system for driving the motor 2, and is isolated from GND of the vehicle-mounted battery power supply 7. However, the high voltage system is used for driving the motor 2, and thus a voltage and a current significantly changes, which may cause noise in the control circuit such as the control microcomputer 9.

GND of the communication interface 5 that communicates with the inverter system 1 is isolated from the GND of the control microcomputer 9, and communication between the communication interface 5 and the control microcomputer 9 is performed via the isolated communication connector 8 such as a photocoupler. Thus, the communication speed is limited by responsivity of the photocoupler used or the like, thereby preventing precise control.

The present invention is achieved on the basis of such technical problems, and has an object to provide an inverter system for a vehicle-mounted air conditioner that prevents noise from entering a control circuit and allows more precise control by high speed communication.

SUMMARY OF THE INVENTION

To achieve the above described object, the present invention provides an inverter system for a vehicle-mounted air conditioner that controls an operation of a motor for driving a compressor that constitutes a vehicle-mounted air conditioner, comprising: a switching element for rotationally driving the motor; a gate circuit for driving a gate of the switching element; a control circuit that performs PWM control of the gate circuit; and a communication interface that communicates with a host control circuit that issues a command to the control circuit from outside the inverter system. The switching element and the gate circuit are isolated from the control circuit, and isolated signal transmission means for transmitting signals while ensuring electrical isolation is provided between the control circuit and the gate circuit.

As the isolated signal transmission means, a photocoupler or an isolated device with a built-in coil may be used.

Thus, the control circuit is isolated from the gate circuit, thereby suppressing the influence, on the control circuit, of noise resulting from changes caused by changes in voltage and current that occur in a voltage system for driving the motor. The control circuit and the communication interface can be directly bus-connected without a photocoupler. Further, the isolated signal transmission means only needs to transmit signals for driving the gate circuit with the control circuit, and thus a needed communication speed can be lower than when the isolated signal transmission means is placed between the control circuit and the communication interface.

The control circuit diagnoses a failure in the motor or the switching element, and when the control circuit determines that there is a failure, the control circuit can transmit information on the determination result to the host control circuit via the communication interface.

In this case, the inverter system can further comprise a temperature detection circuit for detecting the temperature of the switching element, and the control circuit can determine that there is a failure in the motor or the switching element when the temperature of the switching element detected by the temperature detection circuit exceeds a predetermined upper limit value.

Additionally, the control circuit can store historical information that the detected temperature of the switching element exceeds a predetermined threshold or historical information that a failure occurs, and when the historical information that a failure occurs is stored at the start, the control circuit may stop a processing for driving the motor.

The inverter system can further comprise a voltage detection circuit that detects a voltage applied to the switching element and notifies the control circuit of the detection result, and the control circuit can monitor whether an abnormality occurs in the voltage applied to the switching element on the basis of whether a detection value of the voltage by the voltage detection circuit is within a predetermined range.

According to the present invention, the control circuit is isolated from the gate circuit to suppress the influence of noise. Also, the control circuit and the communication interface can be directly bus-connected without a photocoupler, thereby allowing high speed communication therebetween and more precise control. Further, the isolated signal transmission means only needs to transmit signals for driving the gate circuit with the control circuit, and thus a needed communication speed can be lower than when the isolated signal transmission means is placed between the control circuit and the communication interface. Thus, isolated signal transmission means for low speed may be used, thereby reducing cost.

DETAILED DESCRIPTION OF THE PREFERRED EMBODIMENT

Now, the present invention will be described in detail on the basis of an embodiment shown in the accompanying drawings.

Figure 1:
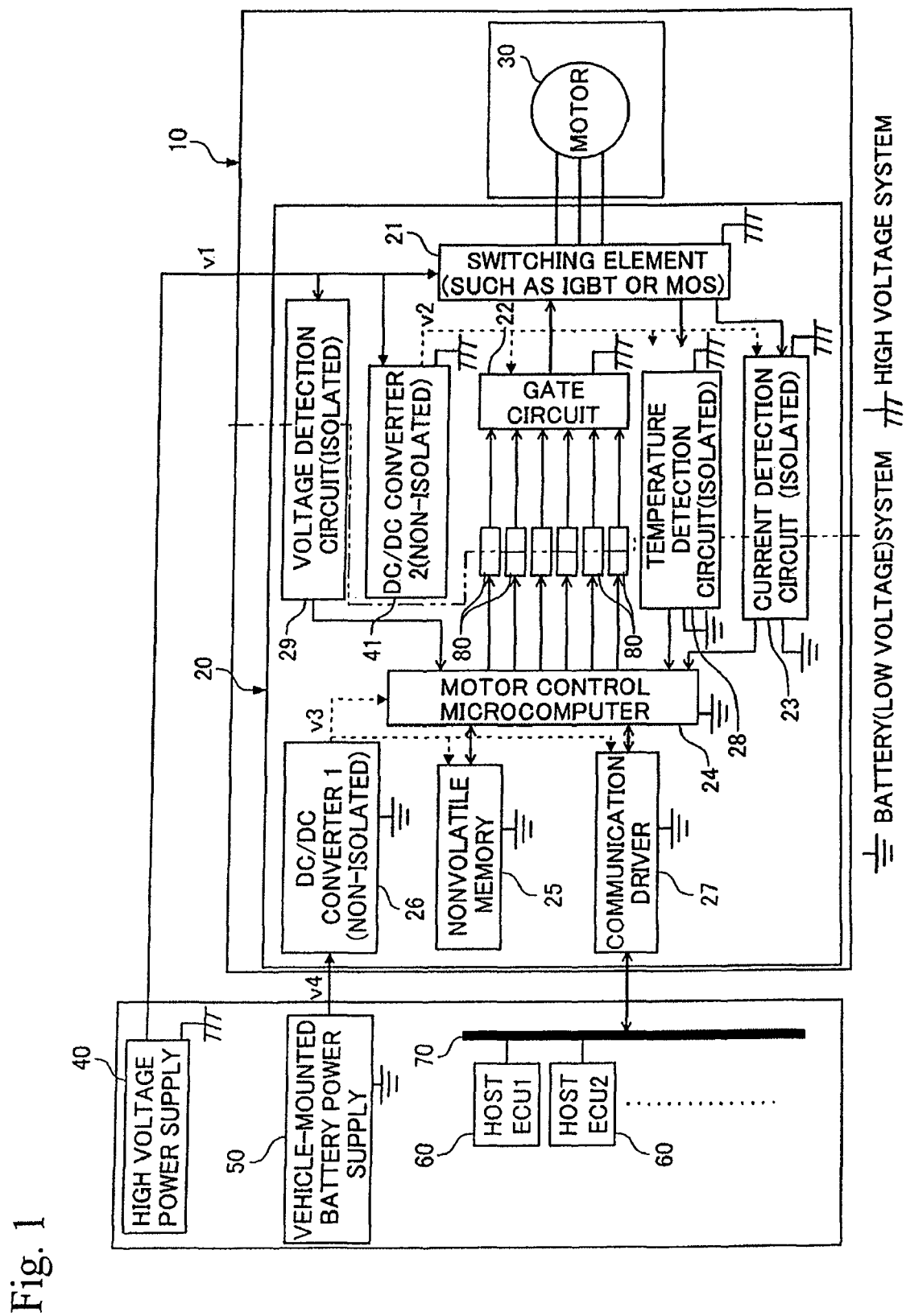
FIG. 1 shows a configuration of an inverter system for a vehicle-mounted air conditioner according to the present invention.
Figure 2:
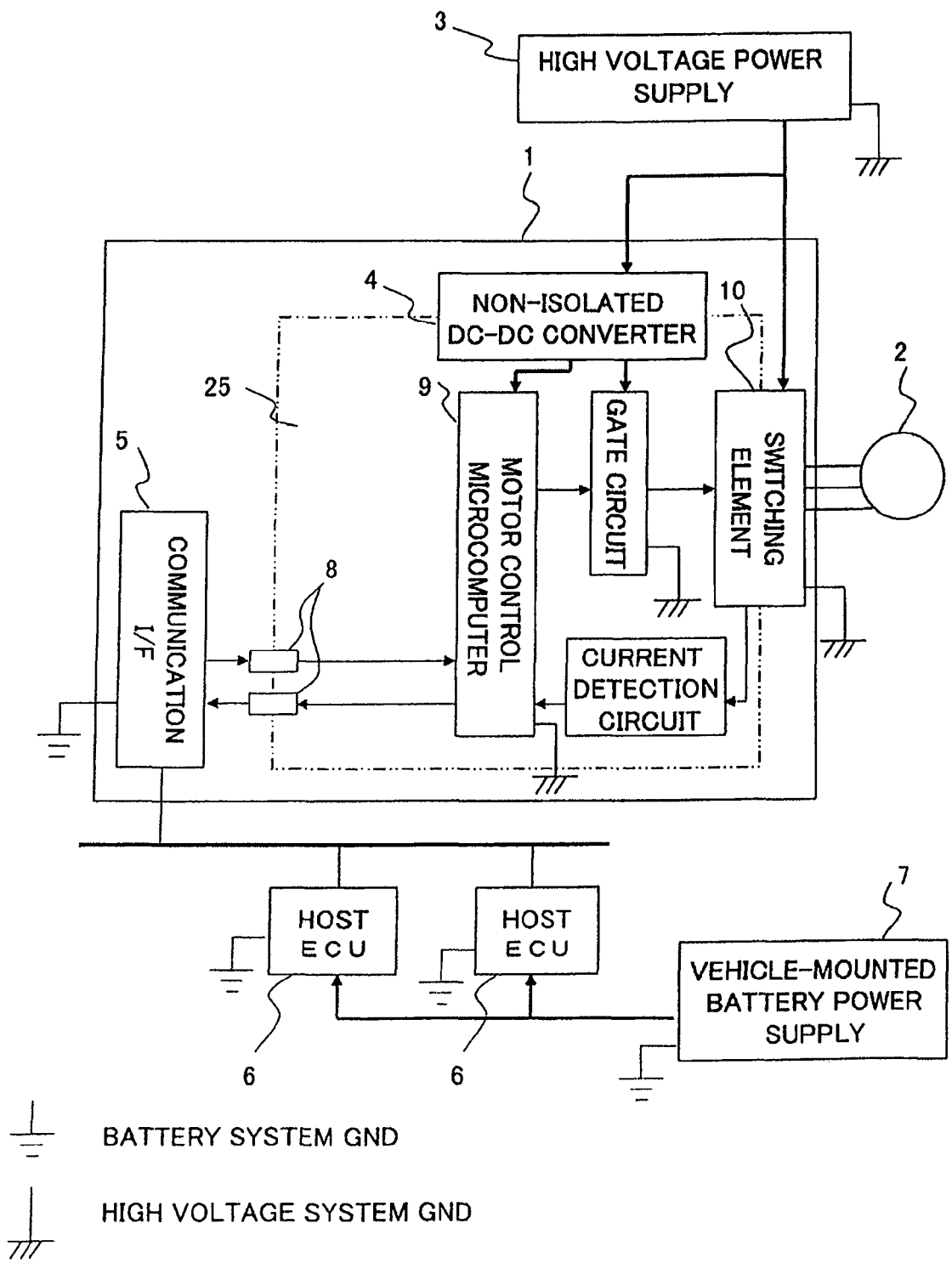
FIG. 2 shows a configuration of a conventional inverter system for a vehicle-mounted air conditioner.

FIG. 1 illustrates a configuration of an inverter system (inverter system for a vehicle-mounted air conditioner) 20 according to the embodiment.

As shown in FIG. 1, the inverter system 20 controls to drive a motor 30 that is a drive source of a compressor that constitutes the vehicle-mounted air conditioner.

The inverter system 20 includes a switching element 21, a gate circuit 22, a current detection circuit 23, a motor control microcomputer (control circuit) 24, and a nonvolatile memory 25.

General vehicles are rated at 150 V or 300 V, and the motor 30 is driven by a high voltage V1 of, for example, 150 V or 300 V supplied from a high voltage power supply 40 such as a high voltage battery or a generator.

The switching element 21 converts a DC current supplied from the high voltage power supply 40 into a three-phase AC current and outputs the current to the motor 30 for driving the motor 30.

The gate circuit 22 drives a gate of the switching element 21 by control by the motor control microcomputer 24, and operates at a predetermined voltage V2 converted from the high voltage V1 supplied from the high voltage power supply 40 by a non-isolated DC/DC converter 41.

The current detection circuit 23 detects a current flowing from the high voltage power supply 40 to the switching element 21, and outputs a detection value to the motor control microcomputer 24.

The motor control microcomputer 24 performs feedback control of an output to the gate circuit 22 on the basis of the detection value of the current inputted from the current detection circuit 23.

The motor control microcomputer 24 controls to drive the motor 30 on the basis of a command signal from a host ECU 60. Thus, the inverter system 20 can perform CAN (Controller Area Network) communication with a CAN bus 70 for communication between ECUs that control vehicle-mounted electrical equipments via a communication driver (communication interface) 27. The communication between the inverter system 20 and the ECU may be of a type other than the CAN communication.

The motor control microcomputer 24, the nonvolatile memory 25, and the communication driver 27 operate at a low voltage V3 of, for example, 5 V. A voltage is supplied to the motor control microcomputer 24 and the nonvolatile memory 25 by converting a battery voltage V4 of, for example, 12 V or 24 V supplied from a vehicle-mounted battery power supply 50 into the low voltage V3 with a non-isolated DC-DC converter 26.

In such an inverter system 20, the motor control microcomputer 24 has a function of diagnosing a failure in the motor 30 or the switching element 21. For example, when there is a failure in the motor 30 or the switching element 21, a temperature of the switching element 21 becomes high. Thus, a thermistor (temperature sensor) provided in the switching element 21 detects the temperature of the switching element 21 and outputs the temperature as a resistance value of the thermistor to a temperature detection circuit 28. The temperature detection circuit 28 converts the resistance value of the thermistor into a voltage and outputs the voltage to the motor control microcomputer 24.

The motor control microcomputer 24 detects the voltage inputted from the temperature detection circuit 28 to monitor the temperature of the switching element 21, and determine whether the detected temperature exceeds a predetermined threshold (upper limit value). When the detected temperature exceeds the threshold, the motor control microcomputer 24 determines (diagnoses) that there is a failure in the motor 30 or the switching element 21.

When determining that there is a failure, the motor control microcomputer 24 can transmit information on the determination result to the host ECU 60 via the communication driver 27 and the CAN bus 70.

The motor control microcomputer 24 stores historical information that the detected temperature of the switching element 21 exceeds the threshold or historical information that a failure occurs in the nonvolatile memory 25 such as an EEPROM. Then, the motor control microcomputer 24 refers to the nonvolatile memory 25 at the start. When the historical information that a failure occurs is stored in the nonvolatile memory 25, the motor control microcomputer 24 can stop a processing for driving the motor 30 thereafter. When the historical information that a failure occurs is stored in the nonvolatile memory 25, the motor control microcomputer 24 can notify the host ECU 60 of the fact. In this case, the host ECU 60 may stop the processing for driving the motor 30 thereafter.

The historical information stored in the nonvolatile memory 25 can be also checked by connecting a diagnosis tool from outside a vehicle in service of the vehicle or the like. This allows retrieval of failure occurrence history.

A voltage detection circuit 29 may be further provided that detects a voltage applied from the high voltage power supply 40 to the switching element 21, and notifies the motor control microcomputer 24 of the detection result. In this case, the motor control microcomputer 24 can monitor whether an abnormality occurs in the voltage applied from the high voltage power supply 40 to the switching element 21 on the basis of whether a detection value of the voltage by the voltage detection circuit 29 is within a predetermined range in a normal operation state. When it is determined by monitoring that there is an abnormality in the voltage applied from the high voltage power supply 40 to the switching element 21, a processing for stopping driving the motor 30 or the like can be performed.

As described above, the switching element 21 receives the DC current supplied from the high voltage power supply 40, and the gate circuit 22 operates at the voltage V2 converted from the high voltage V1 supplied from the high voltage power supply 40. On the other hand, the motor control microcomputer 24, the nonvolatile memory 25, and the communication driver 27 operate at the low voltage V3 converted from the battery voltage V4 supplied from the vehicle-mounted battery power supply 50. Thus, high voltage system GNDs of the switching element 21 and the gate circuit 22 are isolated from battery (low voltage system) GNDs of the motor control microcomputer 24, the nonvolatile memory 25, and the communication driver 27.

Thus, the current detection circuit 23, the temperature detection circuit 28, and the voltage detection circuit 29 are isolated.

The motor control microcomputer 24 needs to be isolated from the gate circuit 22, and thus a photocoupler (isolated signal transmission means) 80 for transmitting signals while ensuring electrical isolation is provided between the motor control microcomputer 24 and the gate circuit 22. An interface other than the photocoupler 80 may be used as long as it can transmit signals while ensuring electrical isolation.

According to the above described configuration, the motor control microcomputer 24 is isolated from the gate circuit 22, and communication therebetween is performed via the photocoupler 80. The motor control microcomputer 24 is isolated from the gate circuit 22, thereby suppressing the influence of noise resulting from changes caused by changes in voltage and current that occur in a high voltage system for driving the motor 30.

Also, the motor control microcomputer 24 and the communication driver 27 can be directly bus-connected without a photocoupler, thereby allowing high speed communication therebetween and more precise control. Further, the photocoupler 80 only needs to transmit signals for driving the gate circuit 22 with the motor control microcomputer 24, and thus a needed communication speed can be lower than when the photocoupler is placed between the motor control microcomputer 24 and the communication driver 27. Thus, a photocoupler for low speed may be used, thereby reducing cost.

In the above described embodiment, the circuit configuration or the like of the inverter system 20 has been described, but the detailed configuration thereof may be changed as long as a function for implementing the gist of the present invention can be exhibited.

Further, the configuration described in the embodiment may be chosen or changed to other configurations without departing from the gist of the present invention.

What is claimed is:

1. An inverter system for a vehicle-mounted air conditioner that controls an operation of a motor for driving a compressor that constitutes a vehicle-mounted air conditioner, comprising:
   a switching element for rotationally driving said motor;
   a gate circuit for driving a gate of said switching element;
   a control circuit that controls said gate circuit; and
   a communication interface that communicates with a host control circuit that issues a command to said control circuit from outside said inverter system,
   a non-volatile memory, and
   a DC-DC converter that converts voltage supplied from a power source to prescribed voltage and applies the voltage to only the control circuit, the communication interface and the non-volatile memory,
   wherein said switching element and said gate circuit are isolated from said control circuit, and isolated signal transmission means for transmitting signals while ensuring electrical isolation is provided between said control circuit and said gate circuit.

2. The inverter system for a vehicle-mounted air conditioner according to claim 1, wherein said isolated signal transmission means is a photocoupler.

3. The inverter system for a vehicle-mounted air conditioner according to claim 1, wherein said isolated signal transmission means is means with a built-in coil.

4. The inverter system for a vehicle-mounted air conditioner according to claim 1, wherein said control circuit diagnoses a failure in said motor or said switching element, and when said control circuit determines that there is a failure, said control circuit transmits information on the determination result to said host control circuit via said communication interface.

5. The inverter system for a vehicle-mounted air conditioner according to claim 4, wherein said inverter system further comprises a temperature detection circuit for detecting the temperature of said switching element, and
   said control circuit determines that there is a failure in said motor or said switching element when the temperature of said switching element detected by said temperature detection circuit exceeds a predetermined upper limit value.

6. The inverter system for a vehicle-mounted air conditioner according to claim 5, wherein said control circuit stores historical information that the detected temperature of said switching element exceeds the predetermined threshold or historical information that a failure occurs, and when the historical information that a failure occurs is stored at the start, said control circuit stops a processing for driving said motor.

7. The inverter system for a vehicle-mounted air conditioner according to claim 1, wherein said inverter system further comprises a voltage detection circuit that detects a voltage applied to said switching element and notifies said control circuit of the detection result, and
   said control circuit monitors whether an abnormality occurs in the voltage applied to said switching element on the basis of whether a detection value of the voltage by said voltage detection circuit is within a predetermined range.

* * * * *